US006993782B1

(12) United States Patent
Newberry et al.

(10) Patent No.: US 6,993,782 B1
(45) Date of Patent: Jan. 31, 2006

(54) PROGRAM GUIDE INFORMATION AND PROCESSOR FOR PROVIDING PROGRAM AND CHANNEL SUBSTITUTION

(75) Inventors: Thomas Patrick Newberry, Westfield, IN (US); Liangzhone Wang, Carmel, IN (US); Glen Wakeman Ruch, Indianapolis, IN (US); Steven Charles Rhoads, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/526,600

(22) Filed: Mar. 16, 2000

Related U.S. Application Data

(60) Provisional application No. 60/144,414, filed on Jul. 16, 1999.

(51) Int. Cl.
H04N 5/445 (2006.01)
H04N 7/10 (2006.01)

(52) U.S. Cl. .......................... 725/39; 725/35; 725/48; 725/49; 725/59

(58) Field of Classification Search ................. 725/39, 725/48.49, 32–61
See application file for complete search history.

(56) References Cited

U.S. PATENT DOCUMENTS

| 4,404,589 | A | | 9/1983 | Wright, Jr. ................... 358/86 |
|---|---|---|---|---|
| 5,359,601 | A | | 10/1994 | Wasilewski et al. .......... 370/73 |
| 5,418,782 | A | | 5/1995 | Wasilewski ................... 370/73 |
| 5,596,373 | A | | 1/1997 | White et al. ................. 348/569 |
| 5,600,378 | A | | 2/1997 | Wasilewski ................. 348/468 |
| 5,774,170 | A | * | 6/1998 | Hite et al. ..................... 725/34 |
| 5,990,883 | A | * | 11/1999 | Byrne et al. ................. 345/721 |
| 6,006,257 | A | * | 12/1999 | Slezak ........................ 725/110 |
| 6,040,850 | A | * | 3/2000 | Un et al. ....................... 725/68 |
| 6,115,074 | A | * | 9/2000 | Ozkan et al. ................ 348/465 |
| 6,133,910 | A | * | 10/2000 | Stinebruner .................. 725/49 |
| 6,160,545 | A | * | 12/2000 | Eyer et al. ................... 345/721 |
| 6,239,794 | B1 | * | 5/2001 | Yuen et al. .................... 725/41 |

(Continued)

FOREIGN PATENT DOCUMENTS

| EP | 0594351 A1 | 4/1994 |
|---|---|---|
| JP | 02081887 | 11/1991 |
| WO | WO97/49242 | 12/1997 |
| WO | WO99/03269 | 1/1999 |
| WO | WO99/20049 | 4/1999 |
| WO | WO00/16548 | 3/2000 |

OTHER PUBLICATIONS

Search Report.

*Primary Examiner*—Christopher Grant
*Assistant Examiner*—Son P. Huynh
(74) *Attorney, Agent, or Firm*—Joseph S. Tripoli; Ronald H. Kurdyla; Joel M. Fogelson (57) ABSTRACT

A system of defining, creating and decoding composite virtual channels advantageously supports dynamic channel and event substitution. A method, for use in a decoder for acquiring a program conveyed on more than one broadcast channel, involves generating a program guide display. The program guide display lists programs being broadcast on a plurality of broadcast channels during specified broadcast time segments and also lists a particular program on both a first and a second broadcast channel. The particular program is acquired from the first broadcast channel in response to user selection of either of the first and second broadcast channels. A plurality of prioritized channel maps are used in substituting an alternative program for a first program on a broadcast channel.

15 Claims, 6 Drawing Sheets

U.S. PATENT DOCUMENTS

| | | | |
|---|---|---|---|
| 6,268,849 B1 * | 7/2001 | Boyer et al. | 725/40 |
| 6,341,374 B2 * | 1/2002 | Schein et al. | 725/43 |
| 6,414,720 B1 * | 7/2002 | Tsukidate et al. | 348/469 |
| 6,487,722 B1 * | 11/2002 | Okura et al. | 725/40 |
| 6,583,825 B1 * | 6/2003 | Yuen et al. | 348/731 |
| 6,799,326 B2 * | 9/2004 | Boylan et al. | 725/35 |

\* cited by examiner

FIG. 1

INDIANAPOLIS

| CH. NO. | CHANNEL |
|---|---|
| 1 | WRTV ABC AFFILIATE (INDY) |
| 2 | WISH CBS AFFILIATE (INDY) |
| 3 | WTHR NBC AFFILIATE (INDY) |
| 4 | ESPN |
| 5 | CNN |
| 6 | HBO |

KOKOMO

| CH. NO. | CHANNEL |
|---|---|
| 1 | WRTV ABC (INDY) |
| 2 | WISH CBS (INDY) |
| 3 | WTHR NBC (INDY) |
| 4 | ESPN |
| 5 | CNN |
| 6 | HBO |
| 11 | WXYZ ABC (KOKOMO) |
| 12 | WHJK CBS (KOKOMO) |
| 13 | WTYR NBC (KOKOMO) |

FORT WAYNE

| CH. NO. | CHANNEL |
|---|---|
| 1 | WRTV ABC (INDY) |
| 2 | WISH CBS (INDY) |
| 3 | WTHR NBC (INDY) |
| 4 | ESPN |
| 5 | CNN |
| 6 | HBO |
| 11 | WQPL ABC (FT. WAYNE) |
| 12 | WDFG CBS (FT. WAYNE) |
| 13 | WTHK NBC (FT. WAYNE) |

FIG. 2

| SYNTAX | BITS | FORMAT |
|---|---|---|
| channel_information_table_section () { | | |
|   table_id | 8 | 0XE2 |
|   section_syntax_indicator | 1 | '1' |
|   private_indicator | 1 | '1' |
|   reserved | 2 | '11' |
|   section_length | 12 | uimsbf |
|   table_id_extension | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   reserved | 2 | '11' |
|   number_channels | 6 | uimsbf |
|   for(i=0; i<number_channels;i++) channel_info() { | | |
|     reserved | 2 | '11' |
|     channel_number | 10 | uimsbf |
|     channel_info_length | 12 | uimsbf |
|     channel_PTC | 8 | uimsbf |
|     short_name | 8*4 | ISO-LATIN-1 |
|     CI_CSS | 32 | bsbf |
|     reserved | 4 | '1111' |
|     number_PIDs | 4 | uimsbf |
|     SPI_indicator | 8 | bsbf |
|     flags (|) { | | |
|       channel_PIP_flag | 2 | bsbf |
|       channel_DIP_flag | 2 | bsbf |
|       indirect_mapping | 1 | '0' |
|       promo_flag | 1 | bsbf |
|       provider_index_flag | 1 | bsbf |
|       name_flag | 1 | bsbf |
|     } | | |
|     if (SPI_indicator==0x00){ | | |
|       for (i = 1;i<= number_PIDs;i++) { | | |
|         zero_bits | 3 | '000' |
|         PID[i] | 13 | uimsbf |
|         SType[i] | 8 | uimsbf |
|       } | | |
|     } else { | | |
|       zero_bits | 3 | '000' |
|       base_PID | 13 | uimsbf |
|     } | | |
|     PIP_PTC | 8 | uimsbf |
|     DIP_PTC | 8 | uimsbf |
|     if (channel_PIP_flag == 0x2) | | |
|       channel_PIP_message_number | 16 | uimsbf |
|     if (channel_DIP_flag == 0x2) | | |
|       channel_DIP_message_number | 16 | uimsbf |
|     if (provider_index_flag == '1') | | |
|       provider_index | 16 | uimsbf |
|     if (name_flag == '1') | | |
|       long_channel_name | 8*n | ISO-LATIN-1 |
|   } | | |
|   CRC_32 | 32 | rpchofS |
| } | | |

FIG. 3

| SYNTAX | BITS | FORMAT |
|---|---|---|
| new_service_infromation() { | | |
|     ci_css | 32 | uimsbf |
|     channel_PTC | 8 | uimsbf |
|     reserved | 4 | '1111' |
|     number_PIDs | 4 | uimsbf |
|     for (i = 1;i<= number_PIDs;i++) { | | |
|         zero_bits | 3 | '000' |
|         PID[i] | 13 | bslbf |
|         SType[i] | 8 | bslbf |
|     } | | |
| } | | |

405 — channel_PTC ... number_PIDs
410 — PID[i] ... }

| CH. NO. CHANNEL PTC A/V PIDs | 8:00 | 8:30 | 9:00 | 9:30 | 10:00 |
|---|---|---|---|---|---|
| 1 WRTV ABC (INDY) 6 100/101 | WHEEL OF FORTUNE | M.A.S.H. | 3 STOOGES | I DREAM OF JEANNIE | NEWS |
| 2 WISH CBS (INDY) 6 110/111 | INDIANA PACERS VS. NEW YORK KNICKS GAME 1 NEW SERVICE INFORMATION: PTC=18 VIDEO PID=110 AUDIO PID=111 | | | | NEWS |
| 3 WTHR NBC (INDY) 6 120/121 | THURSDAY NIGHT MOVIE: DIE HARD | | | | NEWS |
| 4 ESPN 12 100/101 | MOTO CROSS | | NHL: DALLAS VS. COLORADO | | |
| 5 CNN 12 110/111 | REGIONAL NEWS | NATIONAL NEWS | MEET THE PRESS | | NIGHTLY NEWS |
| 6 HBO 12 120/121 | BLAZING SADDLES | | | | HOLY GRAIL |
| 11 WXYZ ABC 18 100/101 (KOKOMO) | EAGLES LIVE | | WHEEL OF FORTUNE | M.A.S.H. | 3 STOOGES |
| 12 WHJK CBS 18 110/111 (KOKOMO) | INDIANA PACERS VS. NEW YORK KNICKS GAME 1 | | | | LARRY BIRD SHOW |
| 13 WTYR NBC 18 120/121 (KOKOMO) | BARBARA WALTERS | NATIONAL NEWS | THURSDAY NIGHT MOVIE: DIE HARD | | |

PROGRAM GUIDE INFORMATION AND PROCESSOR FOR PROVIDING PROGRAM AND CHANNEL SUBSTITUTION

This application claims the benefit of 60/144,414 filed Jul. 16, 1999.

FIELD OF THE INVENTION

This invention is related to the field of digital signal processing, and more particularly to the formation and processing of multimedia program guide information supporting program substitution and the provision of customizable composite virtual channels.

BACKGROUND OF THE INVENTION

Home entertainment systems which combine Personal Computer and television functions (PC/TV systems), are increasingly becoming, generic, User interactive, multiple source and multiple destination communication devices. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g. the Internet) and coaxial lines (e.g. cable TV) and from both remote and local sources such as Digital Video Disk (DVD), CDROM, VHS and Digital VHS (DVHS™) type players, PCs, and many other types of sources.

In such a generic PC/TV entertainment system there is a need to provide a flexible method of adaptively creating virtual channels comprising events (e.g. programs) from different broadcast channels and other remote and local sources. There is also a need for broadcasters to be able to tailor programming and commercials to a particular User and geographic location. Such a system supports substitution of particular channels and events for alternative channels and events under the command of either a User or a broadcast network operator. This enables broadcast markets to be optimally segmented from a broadcaster's perspective and also allows User preferences to be accommodated. These needs and associated problems are addressed by a system according to the present invention.

SUMMARY OF THE INVENTION

A system of defining, creating and decoding composite virtual channels advantageously supports dynamic channel and event substitution. A method, for use in a decoder for acquiring a program conveyed on more than one broadcast channel, involves generating a program guide display. The program guide display lists programs being broadcast on a plurality of broadcast channels during specified broadcast time segments and also lists a particular program on both a first and a second broadcast channel. The particular program is acquired from the first broadcast channel in response to user selection of either of the first and second broadcast channels. A plurality of prioritized channel maps are used in substituting an alternative program for a first program on a broadcast channel.

DETAILED DESCRIPTION OF THE DRAWINGS

Program specific information (PSI) includes program guide data and information for use in identifying and assembling individual data packets to recover the content of selected program channels. The program specific information is advantageously structured to support dynamic channel and event substitution and may be delivered along with program content by different service providers via the Internet, or via terrestrial, satellite or cable broadcast on a subscription or other pay per view basis. The program specific information advantageously incorporates additional tuning information associated with individual events to enable a video decoder to tune to an alternative channel frequency and acquire data elements comprising a program upon predetermined conditions.

A system employing such program specific information may be commanded to seamlessly switch channels (e.g. if the same program is being broadcast on different channels) to enable local advertisements to be viewed by a User rather than those of a remote station, for example. The channel substitution system may also be used to command one or more decoders in a broadcast network to tune to a single channel broadcast for specific information (e.g. emergency broadcast information, Presidents State of the Union address, etc.). The substitute program may also comprise different material such as Internet data, multimedia objects, logos and graphics from different sources. Alternatively, the channel substitution system may be used to dynamically create virtual channels tailored to a User's preferences or structured in accordance with a broadcaster's requirements. For this purpose a new composite virtual channel is created comprised of programs on different broadcast channels e.g. a channel composed of movies available on various broadcast channels such as NBC, ABC, CBS, FOX etc.

The principles of the invention may be applied to terrestrial, cable, satellite, Internet or computer network broadcast systems. Such systems may include, for example, non-MPEG compatible systems, involving other types of encoded datastreams and other methods of conveying program specific information. Further, although the disclosed system is described as processing broadcast programs (events), this is exemplary only. The term 'program' (or event) is used to represent any form of packetized data such as audio data, telephone messages, computer programs, Internet data or other communications, for example.

Hereinafter, data referred to as being MPEG compatible conforms to the MPEG2 (Moving Pictures Expert Group) image encoding standard, termed the "MPEG standard". This standard is comprised of a system encoding section (ISO/IEC 13818-1, 10th Jun. 1994) and a video encoding section (ISO/IEC 13818-2, 20th Jan. 1995). Further, data structure elements according to the invention principles may be conveyed in MPEG compatible format (per section 2.4.4 of the MPEG systems standard) or may be conveyed in a format compatible with the *Program Guide for Digital Television Standard*, document A/55 published by the Advanced Television Systems Committee (ATSC), 3 Jan. 1996, (hereinafter referred to as the ATSC A55 standard) or other ATSC standards. Alternatively, the data structure elements may be formed in accordance with proprietary or custom requirements of a particular system.

Figure 1:
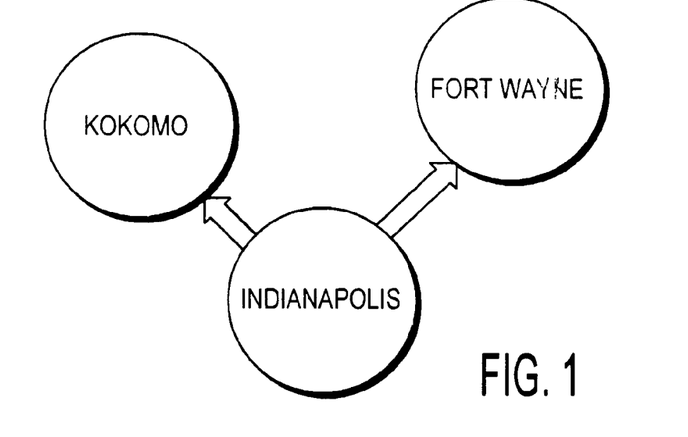
FIG. 1 shows an exemplary fictitious broadcast network comprising three cities.

FIG. 1 shows an exemplary fictitious broadcast network comprising three cities (Indianapolis, Kokomo and Fort Wayne). The network is a Multi-point Microwave Distribution System (MMDS) network but may also be a conventional terrestrial, cable, satellite or Internet broadcast network or other network, for example. The main head-end (Indianapolis) receives all national content channels (e.g. ESPN, HBO, etc.) as well as the local affiliate channels of the national networks (e.g. WISH is the local CBS, affiliate etc.). The head-end broadcasts this content to its customers in the greater Indianapolis area. As this MMDS network grows, it may expand into neighboring cities such as Kokomo and Fort Wayne. The main head-end (Indianapolis) would send its content to secondary head-ends in each of these cities. The broadcast carrier, in the secondary cities, may want to include it in its distribution, the local network affiliates from the secondary cities, as well as the network affiliate from Indianapolis. Specifically, in broadcasting multiple content streams, the local carrier may want viewers to watch one content stream instead of another. This may occur when the same program is being broadcast on the two different channels, for example. A local carrier with this capability is able to advantageously direct a User to watch local advertisements instead of national advertisements.

Figure 2:
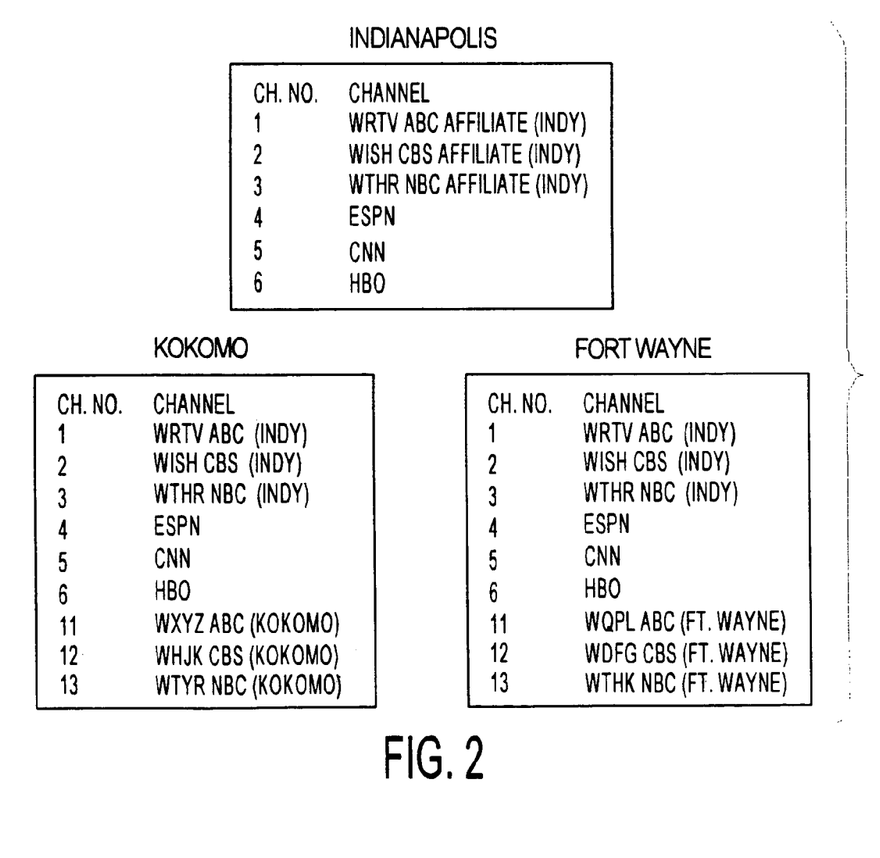
FIG. 2 shows an exemplary channel line-up for the network of FIG. 1, according to the invention.

FIG. 2 shows an exemplary channel line-up for the network of FIG. 1 showing channel line-ups in secondary cities (Kokomo and Fort Wayne) including the head-end national channels and local channels. In the secondary markets (Kokomo and Fort Wayne), a broadcast carrier may wish to dynamically substitute the local network affiliate in place of the Indianapolis network affiliate. This may be desired in the case when a nationally televised NBA basketball game is broadcast in each city on multiple channels, say on both the WRTV ABC and WXYZ ABC affiliates in Kokomo as shown in FIG. 2, for example. The WRTV and WXYZ program content differs in that the local commercials are different between the basketball game broadcasts on the two channels. A network carrier advantageously uses the channel substitution system to command video decoders in the secondary cities that are tuned to the Indianapolis affiliate (WRTV) to tune to the local affiliate (WXYZ-Kokomo) to advantageously maximize the dollar benefit for local advertisers. The video decoders are tuned away to the substitute channel for the duration of the basketball game event.

Program specific information (e.g. an Electronic Program Guide) is advantageously formed to provide a video decoder (e.g. a TV or Set-Top Box) the capability to tune away from receiving a current video program to receive an alternative program (or event). Program specific information is typically arranged in a sequence of hierarchical, inter-linked tables. An exemplary ATSC A55 standard compatible hierarchical table arrangement includes a Master Guide Table (MGT), a Channel Information Table (CIT), Event Information Tables (EITs) and optional tables such as Extended Text Tables (ETTs). The MGT contains information for acquiring program specific information conveyed in other tables such as identifiers for identifying data packets associated with the other tables.

Figure 3:
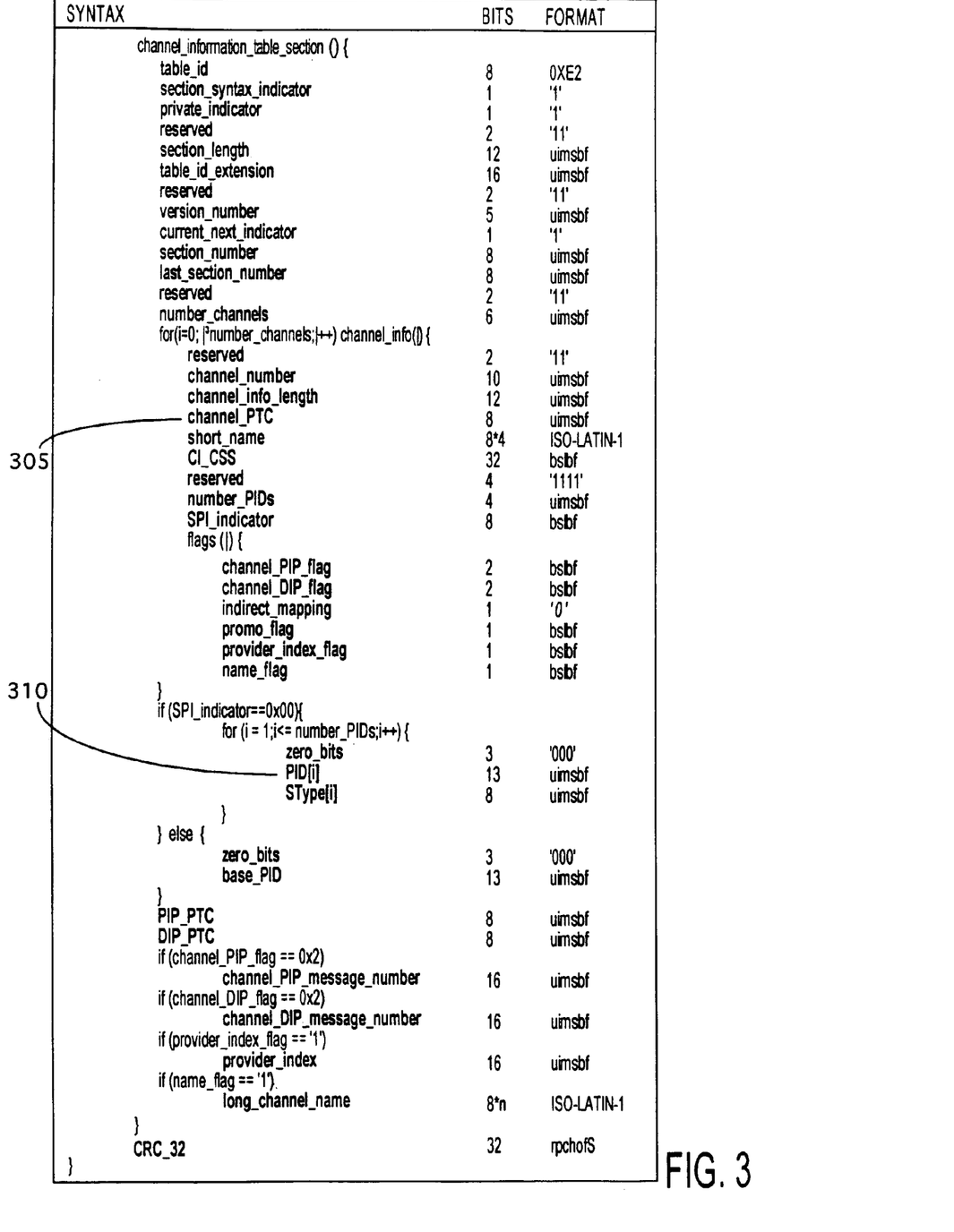
FIGS. 3 and 4 show a Channel Information Table (CIT) and a Channel map defined by a New Service Information table respectively, according to the invention.

The CIT, as exemplified in FIG. 3, contains information for tuning and navigation to receive a User selected program channel and associates a physical transmission channel (PTC) carrier frequency (item 305) with data identifiers (item 310) used to capture datastreams constituting programs conveyed on the transmission channel. The EIT contains descriptive lists of programs (events) receivable on the channels listed in the CIT. Program (event) titles are defined within the EIT using multiple compressed strings supporting multi-lingual program text descriptions (e.g. in English, Spanish, French, etc.) to cater to User language preference. The ETT contains text messages describing programs and program channels. Additional program specific information describing and supplementing items within the hierarchical tables is conveyed within descriptor information elements.

Figure 4:
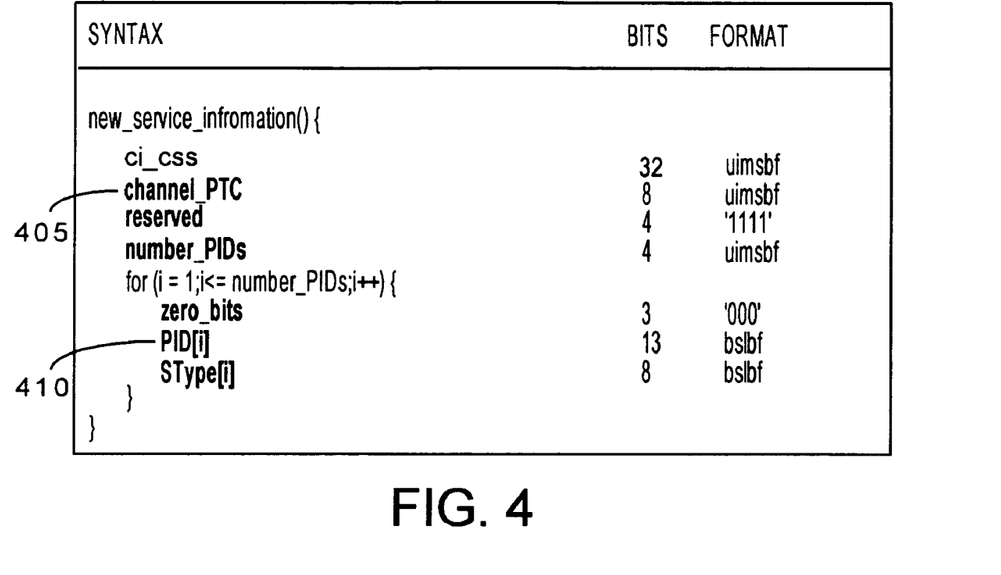

Program specific information is advantageously structured to support dynamic channel and event substitution as well as to support the creation of composite virtual channels by incorporating New Service Information (NSI) exemplified in FIG. 4. The new service information contains the tuning information that a video decoder requires to tune to a desired alternative program. The new service information comprises a channel map that associates an alternative physical transmission channel (PTC) carrier frequency (item 405) with data identifiers (item 410) used to capture datastreams constituting alternative programs conveyed on the alternative transmission channel. The new service information enables an alternative program/channel to be substituted for another program/channel in response to a number of different conditions. These conditions include, for example, (a) predetermined channel map priority, (b) a User program/channel preference profile, (c) a substitution profile downloaded from a remote head-end or a command from a head-end and (d) in response to geographic region information.

In the described ATSC A55 standard compatible embodiment, the new service information is hierarchically linked to individual programs listed in an Event Information Table via an unused language indicator within a multiple compressed string table associated with the Event Information Table. The language indicator is used within a video decoder to indicate that new service information is available for a particular program and is used to command the decoder to tune away from the current program and channel to receive the alternative program and channel listed in the new service information. This program and channel substitution occurs under the predetermined conditions previously described. In other embodiments, the new service information may be directly linked to programs within the event information table itself or may be linked to individual events via a variety of other mechanisms such as via other tables (e.g. by being associated with program packet identifiers (PIDs) or a channel PTC in the channel information table) or associated descriptor information. Further, the new service information may be linked to channels listed in a channel information table to substitute one channel for another channel, or to substitute a group of events for another group of events and is not limited to the substitution of an individual event for another.

A program specific information data structure incorporating the new service information comprising substitute program/channel mapping data may also be advantageously used to dynamically (and seamlessly) create composite virtual channels. Such virtual channels do not require additional transmission bandwidth but are comprised of programs, Internet data, multimedia objects, logos and graphics that are transmitted from different sources including different broadcast channels. A virtual channel may include web pages, text data, video clips, audio clips, animation or conventional programs tailored to a User's preferences or structured in accordance with a broadcaster's requirements, for example. Such a channel may comprise a football channel, where all the football games on other channels are consolidated. No time displacement is involved and a program that is shown on the composite virtual channel simultaneously appears on at least one other channel.

Figure 5:
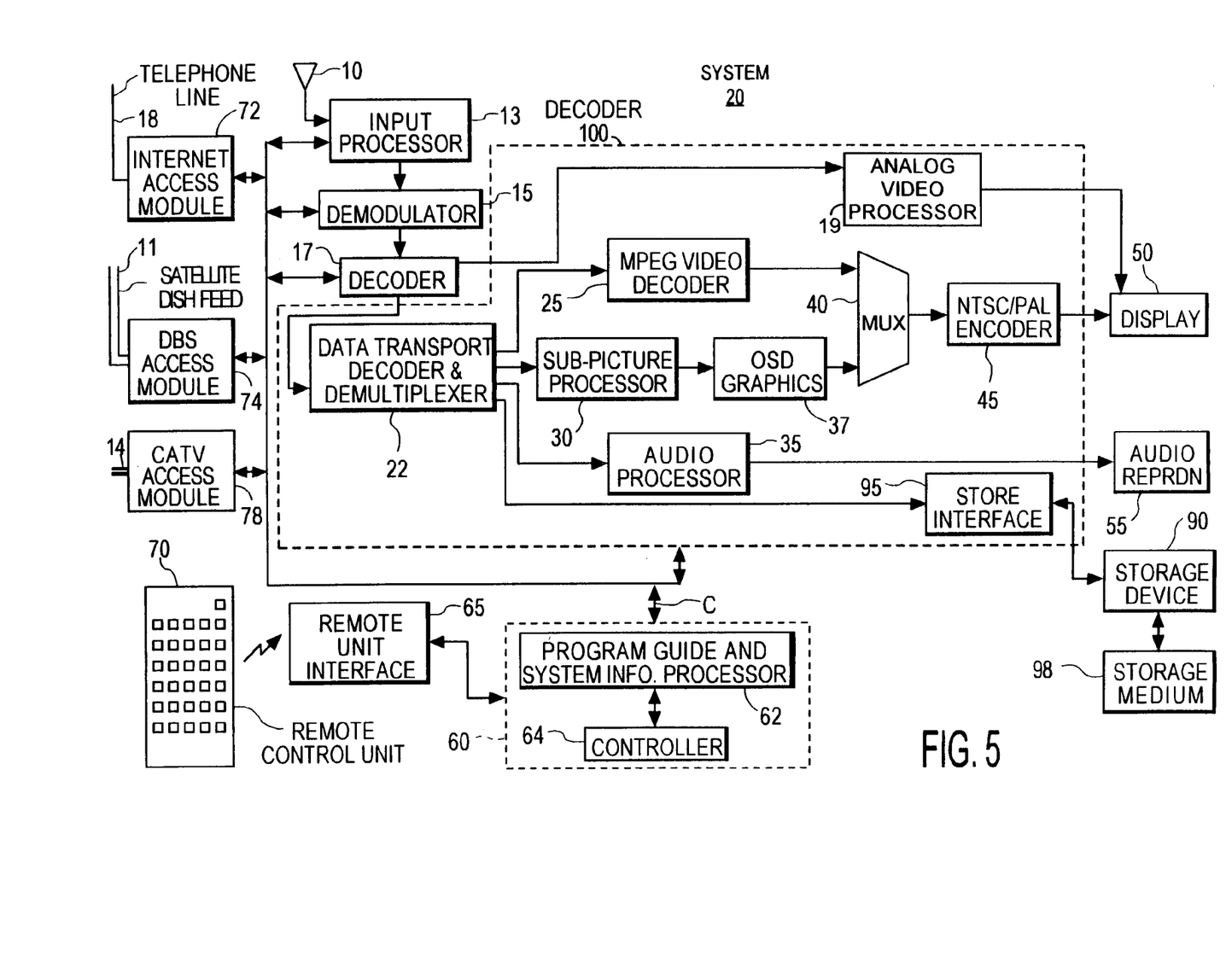
FIG. 5 shows a decoder system for forming and decoding multimedia program data and program guide information, according to the invention.

FIG. 5 shows a decoder system for forming and decoding multimedia program data and program guide information. The decoder system receives program data and program guide information from satellite, cable and terrestrial sources including via telephone line from Internet sources, for example. In the decoder system of FIG. 5 (system 20), a terrestrial broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The corrected output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder system 100. These other elements include video decoder 25, audio processor 35, sub-picture processor 30, on-screen graphics display generator (OSD) 37, multiplexer 40, NTSC encoder 45 and storage interface 95. In one mode, decoder 100 provides MPEG decoded data for display and audio reproduction on units 50 and 55 respectively. In another mode, the transport stream from unit 17 is processed by decoder 100 to provide an MPEG compatible datastream for storage on storage medium 98 via storage device 90. In an analog video signal processing mode, unit 19 processes a received video signal from unit 17 to provide an NTSC compatible signal for display and audio reproduction on units 50 and 55 respectively.

In other input data modes, units 72, 74 and 78 provide interfaces for Internet streamed video and audio data from telephone line 18, satellite data from feed line 11 and cable video from cable line 14 respectively. The processed data from units 72, 74 and 78 is appropriately decoded by unit 17 and is provided to decoder 100 for further processing in similar fashion to that described in connection with the terrestrial broadcast input via antenna 10.

A user selects for viewing either a TV channel or an on-screen menu, such as a program guide, by using a remote control unit 70. Processor 60 uses the selection information provided from remote control unit 70 via interface 65 to appropriately configure the elements of FIG. 5 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 5, they may alternatively be implemented within a single processor. For example, the functions of units 62 and 64 may be incorporated within the programmed instructions of a microprocessor. Processor 60 configures processor 13, demodulator 15, decoder 17 and decoder system 100 to demodulate and decode the input signal format and coding type. Units 13, 15, 17 and sub-units within decoder 100 are individually configured for the input signal type by processor 60 setting control register values within these elements using a bi-directional data and control signal bus C.

The transport stream provided to decoder 100 comprises data packets containing program channel data and program specific information. Unit 22 directs the program specific information packets to processor 60 which parses, collates and assembles this information into hierarchically arranged tables. Individual data packets comprising the User selected program channel are identified and assembled using the assembled program specific information. The program specific information contains conditional access, network information and identification and linking data enabling the system of FIG. 5 to tune to a desired channel and assemble data packets to form complete programs. The program specific information also contains ancillary program guide information (e.g. an Electronic Program Guide—EPG) and descriptive text related to the broadcast programs as well as data supporting the identification and assembly of this ancillary information.

Processor 60 assembles received program specific information packets into multiple hierarchically arranged and inter-linked tables. The hierarchical table arrangement includes a Master Guide Table (MGT), a Channel Information Table (CIT) as exemplified in FIG. 3 as well as Event Information Tables (EITs) and optional tables such as Extended Text Tables (ETTs). The hierarchical table arrangement also incorporates new service information (NSI) according to the invention. As previously discussed, the NSI is hierarchically linked to individual programs listed in an Event Information Table via an unused language indicator within multiple compressed string tables associated with individual events in the Event Information Table. The language indicator is used within a video decoder to indicate that new service information is available for a particular program and is used to command the decoder to tune away from the current program and channel to receive the alternative program and channel listed in the new service information. The resulting program specific information data structure formed by processor 60 via unit 22 is stored within internal memory of unit 60.

Figure 6:
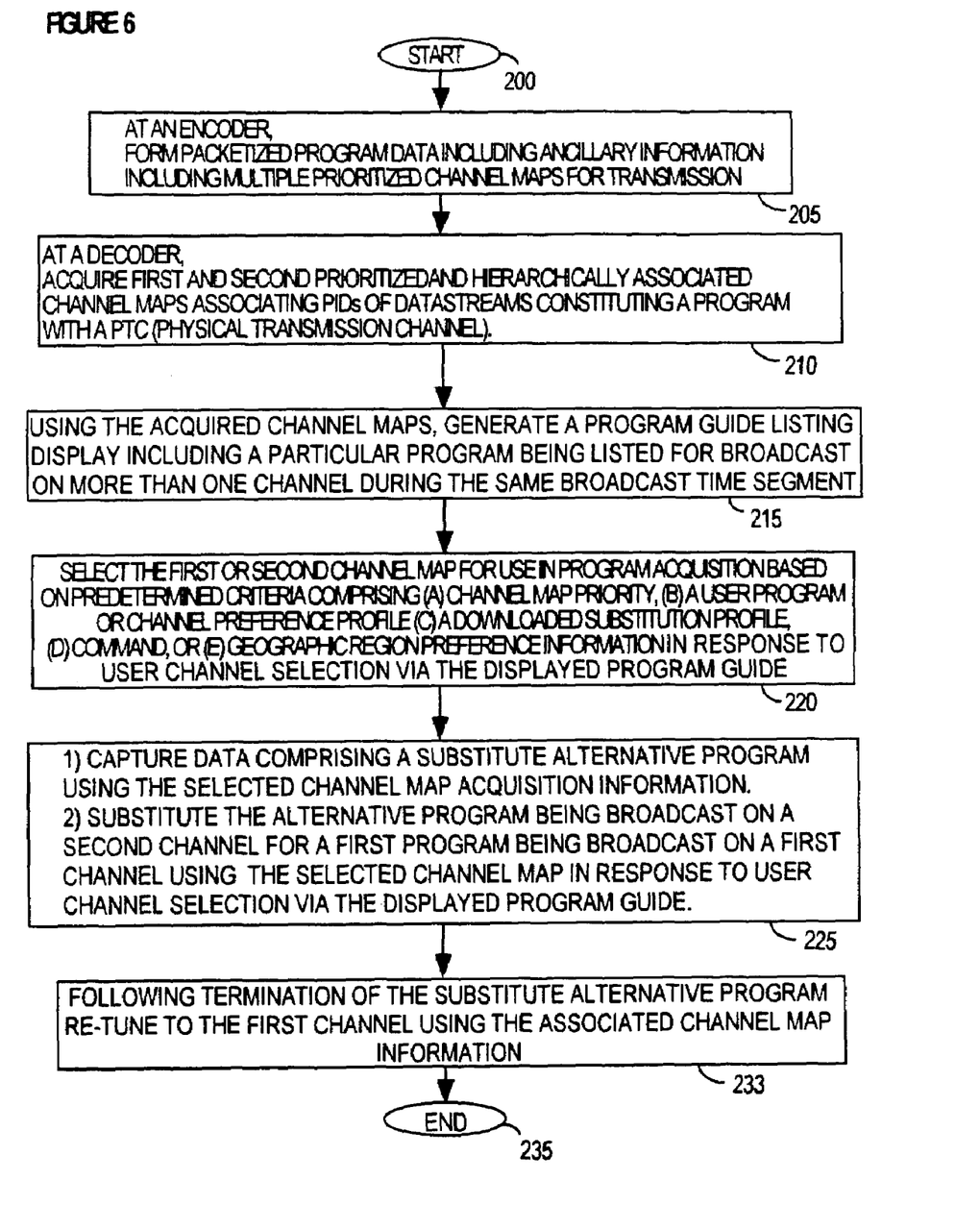
FIG. 6 shows a flowchart of a method for forming and acquiring prioritized channel maps and substituting channels and programs, according to the invention.

FIG. 6 shows a flowchart for forming and acquiring prioritized channel maps and substituting channels and programs. Specifically, FIG. 6 shows a flowchart involving forming packetized program data by an encoder (step 205) and decoding and processing the packetized program data (steps 210–233) using system 20 (FIG. 5) under direction of processor 60. A system employing the channel and program substitution method of FIG. 6 advantageously enables dynamic creation of virtual channels including multimedia (e.g. Internet content) information tailored to a User's preferences as well as the substitution of local advertisements to replace national broadcast advertisements, for example. In step 205, following the start at step 200, packetized program data including ancillary program specific information, is formed at an encoder for broadcast to decoding units such as set-top boxes or TVs, for example. The ancillary program specific information incorporates multiple prioritized channel maps (such as the CIT shown in FIG. 3 and the NSI as shown in FIG. 4) that advantageously enables dynamic channel and program substitution.

Following transmission of the packetized program data and its reception by system 20 (FIG. 5), processor 60, in step 210 (FIG. 6), directs system 20 in acquiring the program specific information including prioritized channel maps. The channel maps associate packet identifiers (PIDs) of datastreams constituting a program with a physical transmission channel (PTC) and corresponding carrier frequency used for conveying the datastreams. In step 215, the acquired program specific information, including prioritized CIT and NSI channel maps and EIT and ETT information and associated descriptors, is used by processor 60, sub-picture processor 30 and OSD processor 37 (FIG. 5) in generating a program guide listing for display on reproduction device 50 via multiplexer 40 and NTSC encoder 45. An exemplary generated program guide listing is shown in FIG. 7.

Figure 7:
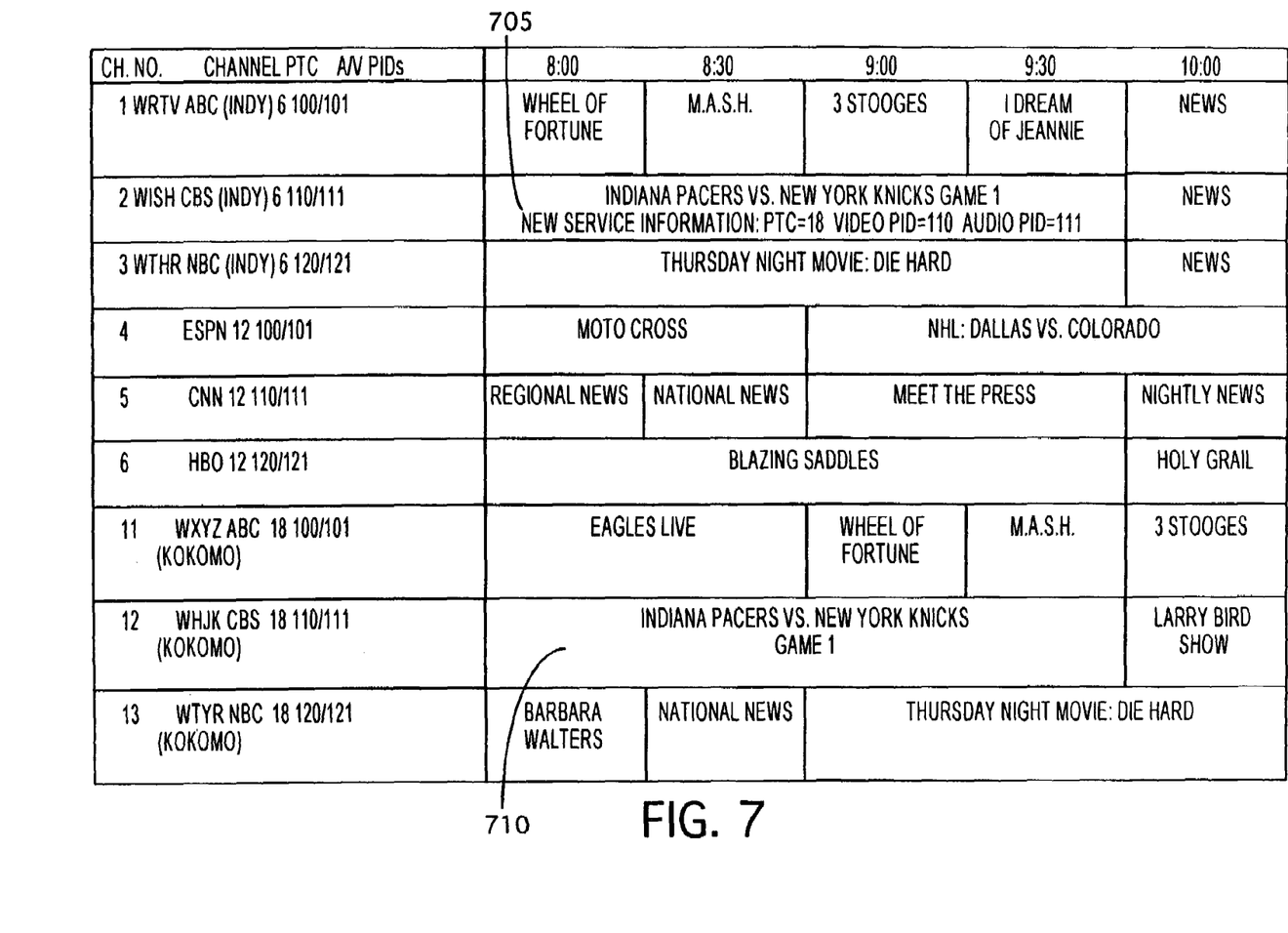
FIG. 7 shows a program guide display listing a channel and a corresponding substitute channel and associated program tuning and acquisition information, according to the invention.

FIG. 7 shows a generated program guide display that lists a channel and its substitute channel and associated program tuning and acquisition information for Kokomo in the MMDS broadcast network shown in FIGS. 1 and 2. The displayed guide shows Kokomo video programming for Thursday May 27, 1999 between 8:00 and 10:00 PM. In this example, program item 705 on channel 2 from 8:00 PM to 10:00 PM is associated with new service information for the Pacers v. Knicks game.

Continuing with step 220 of FIG. 6, processor 60 (FIG. 5) responds to a User's selection of channel 2 for viewing by selecting a channel map for use in channel and program acquisition. Note, the User may select channel 2 for viewing by making an icon selection in the exemplary guide of FIG. 7 or by any other data entry method. In step 220 processor selects the channel map conveyed within the new service information (in preference to the use of CIT channel map information) based on a predetermined channel map priority and uses this information to substitute an alternative program and channel for program item 705 on channel 2. In other embodiments, processor 60 may select the channel map to be used based on, (a) a User program or channel preference profile, (b) a substitution profile downloaded from a remote head-end or a command from a head-end and (c) in response to geographic region information e.g. a map substituting one or more channels and programs of one region for those of another region.

In step 225, processor 60 uses the new service information selected in step 220 to substitute the Pacers v. Knicks game broadcast on channel 12 containing local advertisements for the same game being broadcast on channel 2 containing national advertisements. Thereby, the local carrier is able to advantageously maximize advertisement revenue. A User tuned to channel 2 program item 705 (FIG. 7) is tuned away from the current PTC/Audio PID/Video PID to a new set of parameters (PTC=18, A/V PIDs=110/111) conveyed in the NSI and corresponding to channel 12 program item 710. In step 225, processor 60 in conjunction with units 13, 15, 17 and demultiplexer 22 (FIG. 5) tunes to receive channel 12 and acquire packets comprising the alternative Pacers v. Knicks game broadcast on channel 12. The identified packets are decoded by unit 25 and processed by NTSC encoder 45 (via multiplexer 40) and the resulting image data, comprising the Pacers v. Knicks game, is displayed on unit 50 (FIG. 5). Upon termination of the substitute Pacers v. Knicks game in step 233, processor 60 directs system 20 to re-tune to channel 2 to receive the news program on this channel (e.g. on PTC=6, A/V PIDs=110/111). The seamless nature of the channel and program substitution means that the User may be unaware of the substitution. The method of FIG. 6 terminates at step 235.

The architecture of FIG. 5 is not exclusive. Other architectures may be derived in accordance with the principles of the invention to accomplish the same objectives. Further, the functions of the elements of decoder 100 of FIG. 5 and the process steps of FIG. 6 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate program specific information according to invention principles may be recorded on a storage medium and transmitted or re-broadcast to other servers, PCs or receivers.

What is claimed is:

1. In a video decoder, a method for acquiring a program conveyed on more than one broadcast channel, comprising the steps of:
   generating a program guide display listing programs being broadcast on a plurality of broadcast channels during specified broadcast time segments, wherein said program guide display lists a particular program on both a first and a second broadcast channel; and
   acquiring said particular program from said first broadcast channel in response to user selection of said second broadcast channel, wherein
   (i) said broadcast channels are transmitted using the same transmission modality, wherein the same transmission modality is selected from the group of: an internet broadcast, a terrestrial broadcast, a satellite broadcast, and a cable broadcast; and
   (ii) said first broadcast channel is selected as the source for said particular program in view of geographical information.

2. A method according to claim 1, wherein
   said particular program Is acquired using packet identification and channel tuning information conveyed in one of a plurality of channel maps associating a transmission channel carrier frequency with data identifiers used to capture datastreams constituting said particular program.

3. A method according to claim 2, wherein
   said plurality of channel maps are allocated a predetermined priority.

4. A method according to claim 1, wherein
   said user selection of said second broadcast channel is performed via selection of a displayed item in said program guide display.

5. A method according to claim 1 wherein said geographic information is a substitution profile downloaded from a remote head-end.

6. A method according to claim 1, including the step of acquiring said particular program from said first broadcast channel using a channel map selected in accordance with a predetermined priority.

7. A method according to claim 6, wherein
   said channel map associates a transmission channel carrier frequency with data identifiers used to capture datastreams constituting said particular program conveyed on said first broadcast channel.

8. A method for substituting a program conveyed on a first broadcast channel for a program conveyed on a second broadcast channel, comprising the steps of:
   acquiring a first channel map associating a first transmission channel carrier frequency with data identifiers used to capture datastreams constituting a first program conveyed on a first broadcast channel;

acquiring a second channel map associating a second transmission channel carrier frequency with data identifiers used to capture datastreams constituting an alternative program conveyed on a second broadcast channel; and substituting said alternative program for said first program in response to predetermined criteria by using said second channel map information to initiate acquisition of said second broadcast channel and said alternative program and in response to user selection of said first broadcast channel, wherein said first program and said alternative program are the same, and wherein (i) said first and second transmission channel carrier frequency use the same broadcast modality selected from a satellite broadcast, a terrestrial broadcast, and a cable broadcast, and (ii) geographical criteria are used for said substitution step.

9. A method according to claim 8, wherein said first channel map contains information for use in acquiring programs conveyed on a first set of broadcast channels, and said second channel map contains information for use in acquiring an alternative program conveyed on an alternative broadcast channel corresponding to one of said channels in said first set of broadcast channels.

10. A method according to claim 8, including the step of examining said acquired second channel map for alternative program data being conveyed on an alternative broadcast channel in response to a channel change command.

11. A method according to claim 10, including the steps of automatically substituting an alternative program and alternative broadcast channel identified as being available for a User selected channel by said acquired second channel map, and tuning to receive said alternative program and alternative broadcast channel in response to a channel change command.

12. A method according to claim 8, wherein said predetermined criteria comprises at least one of, (a) channel map priority, and (b) a User program preference profile and (c) a substitution profile downloaded from a remote head-end.

13. A method according to claim 8, wherein said geographical information is used to receive a local broadcast of said program conveyed on a second broadcast channel over a local broadcast of said program conveyed on a first broadcast channel.

14. A method according to claim 8, wherein said predetermined criteria comprises a command derived from a remote head-end.

15. A method according to claim 8, including the step of re-tuning to acquire one of (a) said first program and (b) a second program different to said alternative and said first program following completion of said alternative program.

* * * * *